JAMES F. BREWER.

Improvement in Pie-Tongs.

No. 125,878.  Patented April 23, 1872.

Witnesses.
Nettie Shepard
E. A. Shepard

Inventor.
James F. Brewer,
By James Shepard, Atty.

125,878

UNITED STATES PATENT OFFICE.

JAMES F. BREWER, OF PLANTSVILLE, CONNECTICUT.

IMPROVEMENT IN PIE-TONGS.

Specification forming part of Letters Patent No. 125,878, dated April 23, 1872.

*To all whom it may concern:*

Be it known that I, JAMES F. BREWER, of Plantsville, in the county of Hartford and State of Connecticut, have invented a new and useful Improvement in Pie-Tongs, of which the following is a specification:

My invention consists of a new article of manufacture, to wit, cast-metal pie-tongs, of the form hereinafter described.

Figure 1:
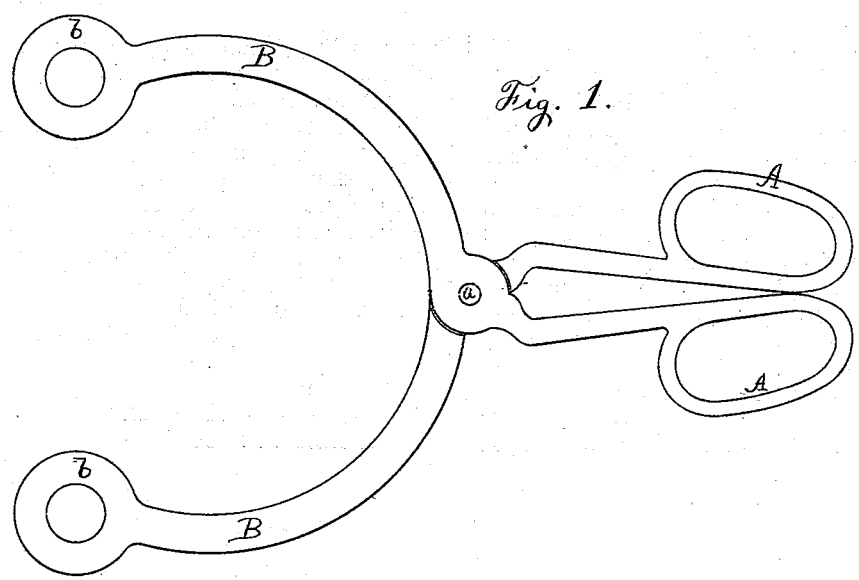
Figure 2:
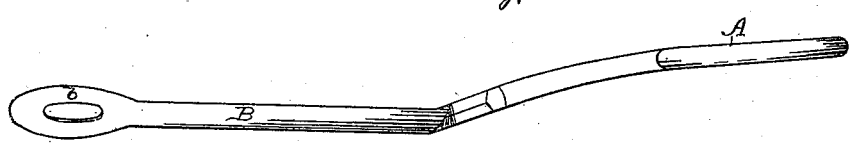

In the accompanying drawing, Figure 1 is a top view of tongs which embody my invention, and Fig. 2 is a side elevation of the same.

The tongs are cast in halves, and secured together by the rivet *a*, which forms the joint. The handles A A are bow-handles, similar to those of shears. The arms B B are curved, as shown in Fig. 1, and are provided at the end with a small pan, *b*, the outside edge of which pan inclines slightly outward.

These tongs are designed for use in handling hot pie-plates, pans, and similar articles, by griping them with the arms B B upon the flaring edges or sides of said articles.

I claim as my invention—

As a new article of manufacture, the cast-metal pie-tongs, formed substantially as herein shown and described.

JAMES F. BREWER.

Witnesses:
  WILSON W. KNOWLES,
  HEBER L. IVES.